B. T. BABBITT.
Pneumatic Propulsion of Vessels.

No. 219,896. Patented Sept. 23, 1879.

UNITED STATES PATENT OFFICE.

BENJAMIN T. BABBITT, OF NEW YORK, N. Y.

IMPROVEMENT IN PNEUMATIC PROPULSION OF VESSELS.

Specification forming part of Letters Patent No. 219,896, dated September 23, 1879; application filed March 31, 1879.

*To all whom it may concern:*

Be it known that I, BENJAMIN T. BABBITT, of the city and State of New York, have invented certain new and useful Improvements in Pneumatic Propulsion of Vessels, of which the following is a full, clear, and exact description, reference being had to the accompanying drawings, forming part of this specification.

This invention consists in certain combinations with a vessel having a submerged forward compartment open at its front and sides, of a water or bucket wheel within said compartment preferably surrounded by deflectors to conduct the water onto said wheel, deflectors in the side of said compartment arranged to provide for clearance from the sides of the vessel of the water which passes through said wheel, a wind-wheel mounted on the vessel, one or more air-compressing pumps operated by said wind-wheel, a receiver for storing the air supplied by said pumps, an engine driven by the air drawn from said receiver, and a propeller and propeller-shaft geared for operation conjointly with the engine and water-wheel, whereby not only the wind-wheel stores power to propel the vessel, but the water-wheel assists in reducing the resistance encountered by the vessel in its passage through the water.

Figure 1:
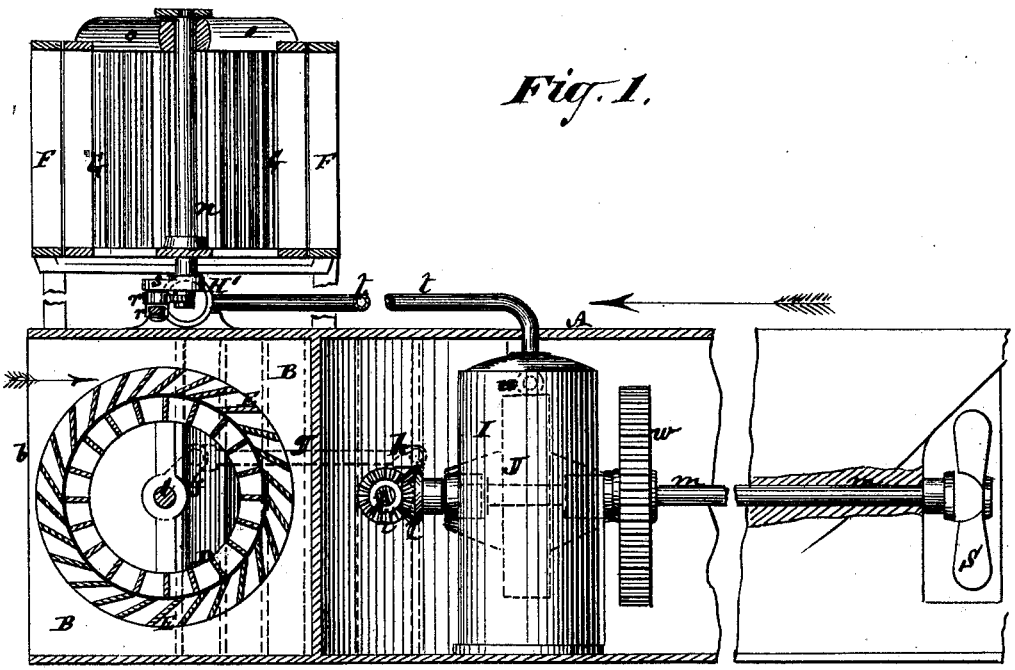
Figure 2:
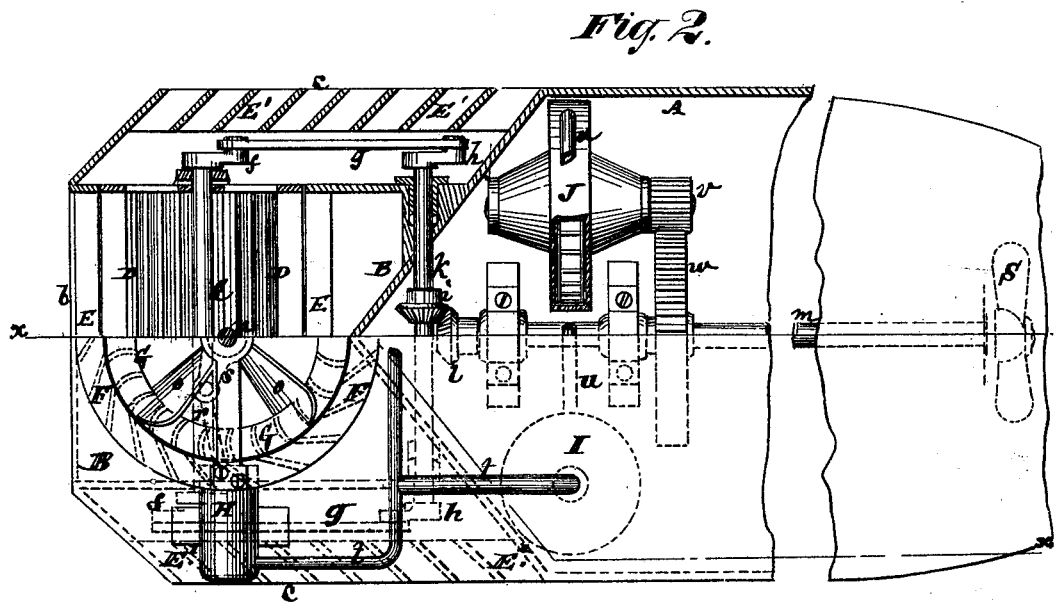

In the accompanying drawings, Figure 1 represents an irregular vertical longitudinal section on the line $x\ x$, Fig. 2, of the front and rear portions of a vessel having my invention applied, and Fig. 2 a half-sectional plan of the same.

A is the hull of the vessel, which is made with a front compartment, B, open at its forward end, $b$, and sides $c\ c$ below the water-level. C is a horizontal shaft arranged transversely of the vessel and carrying a bucket-wheel, D, within said compartment B. Surrounding this bucket-wheel is a circular series of deflectors, E, which serve to direct the water entering through the open front $b$ onto the buckets of said wheel to rotate the latter, the resistance of the water when the vessel is moving forward assisting in such action. The water after striking the buckets passes into the interior of the wheel, and is exhausted through the open ends of the latter, and from thence passes out through or between a series of upright reflectors, E', in the open sides $c$ of the compartment B. These deflectors E' are set inclining outwardly and backwardly on either side of the vessel to give a ready clearance for the water entering the compartment B after it has performed its duty of rotating or keeping up the rotation of the bucket-wheel D.

Fast on the shaft C of said bucket-wheel are cranks $f$, which serve to give motion, by means of rods $g$ and cranks $h$, to a cross counter-shaft, $k$, on which is a bevel-wheel, $i$, that gears with a bevel-wheel, $l$, on a propeller-shaft, $m$, having secured to it a screw-propeller, S, in the stern of the vessel.

Mounted on the submerged compartment B at a suitable elevation above the surface of the water is a stationary circular frame or series of vertical deflectors, F, having arranged within it a wind or bucket wheel, G, fast on an upright shaft, $n$, and preferably provided at its upper end with oblique arms or blades $o$ to assist in the rotation of the wheel by the pressure of the exhaust air as it escapes through the open ends of the wheel, the wind, from whichever direction it may blow, being primarily introduced to the wheel through or between the deflectors F to rotate the wheel in a given direction. Said wind-wheel G, as also the submerged water or bucket wheel D, may, however, be of any desired construction.

H H' are air-compressing pumps, which may be arranged on opposite sides of the axis of the wheel G, and the pistons of which are driven by the latter—as, for instance, by rods $r$, connecting them with a crank, $s$, fast on the shaft $n$ of said wheel. These pumps, as the wheel G is rotated by the wind, serve to keep a receiver, I, in the hold of the vessel or elsewhere supplied with compressed air, which is conducted to it from the pumps by a pipe or pipes, $t$. J is a rotary engine of any suitable construction, but preferably of the bucket-wheel description. This engine, which is driven by compressed air supplied to it by a pipe, $u$, from the receiver I, has its shaft geared with the propeller-shaft $m$ by a pinion, $v$, and spur-wheel $w$, or otherwise.

By the action of the wind-wheel G the receiver I is kept supplied and replenished with compressed air to start and keep the engine J running, which engine in its turn drives the propeller S, and when the vessel is under headway, the water-wheel D being also geared with the propeller-shaft and being within the submerged compartment B, assists in relieving the forward end of the vessel of dead resistance and aids in the propulsion of the vessel, the water which enters between the deflectors E passing out at an angle on either side of the vessel through or between the deflectors E' in the sides of said compartment toward the rear of the vessel, but away from its sides.

I claim—

1. The combination, with a vessel, of a submerged bucket-wheel, a circular series of deflectors surrounding said wheel, a compartment at the forward end of the vessel within which said wheel is submerged, having an open front and sides, and a series of upright deflectors on either side of said compartment constructed to pass the water from the wheel laterally outward in a backwardly direction relatively to the hull of the vessel, substantially as specified.

2. The combination of the submerged bucket-wheel D, the surrounding circular series of deflectors E, the submerged compartment B, open at its sides and front, the side deflectors E', the screw-propeller shaft $m$, the screw-propeller S, and gearing connecting said shaft with the bucket-wheel D, essentially as described.

3. The combination, with a vessel, of a wind-wheel, G, a submerged bucket or water wheel, D, the submerged forward compartment, B, open at its front and sides, the deflectors E' in the sides of said compartment, one or more air-compressing pumps, H H', operated by the wind-wheel, the air-receiver I, a compressed-air engine, J, deriving its motion from the air in said receiver, the propeller S, and mechanism gearing said water-wheel, engine, and propeller for operation together, substantially as specified.

B. T. BABBITT.

Witnesses:
L. BABBITT,
D. J. NEWLAND.